United States Patent [19]
Hobbs

[11] Patent Number: 5,431,533
[45] Date of Patent: Jul. 11, 1995

[54] ACTIVE VANED PASSAGE CASING TREATMENT

[75] Inventor: David E. Hobbs, South Windsor, Conn.

[73] Assignee: United Technologies Corporation, Hartford, Conn.

[21] Appl. No.: 138,582

[22] Filed: Oct. 15, 1993

[51] Int. Cl.6 ............................................. F01D 1/12
[52] U.S. Cl. .................................... 415/58.7; 415/145
[58] Field of Search ................... 415/145, 148, 58.7, 415/58.2, 58.3, 58.4, 58.5

[56] References Cited

U.S. PATENT DOCUMENTS

| | | | |
|---|---|---|---|
| 3,620,640 | 11/1971 | Lariviere | 415/148 |
| 3,846,038 | 11/1974 | Carriere et al. | 415/145 |
| 4,155,221 | 5/1979 | Dhoore et al. | 415/145 |
| 5,308,225 | 5/1994 | Koff et al. | 415/58.7 |

FOREIGN PATENT DOCUMENTS

| | | | |
|---|---|---|---|
| 0497574 | 8/1992 | European Pat. Off. | F04D 29/54 |
| 2349740 | 4/1977 | France | F02K 3/02 |
| 0881743 | 7/1953 | Germany | 415/58.5 |
| 1357016 | 6/1971 | United Kingdom | F16K 13/00 |
| 2041149 | 9/1980 | United Kingdom | F04D 29/68 |
| 2158879 | 11/1985 | United Kingdom | F04D 27/02 |

Primary Examiner—Edward K. Look
Assistant Examiner—Mark Sgantzos
Attorney, Agent, or Firm—Norman Friedland

[57] ABSTRACT

The recirculating flow in the vaned passage in the case surrounding the tips of the fan blades of a turbo fan engine or ducted fan propulsor is modified or blocked off during certain engine or aircraft operating modes. In one embodiment an aneroid valve closes off the vaned passage upon attaining a given altitude and fails open to assure that the safe stall margin is retained during take off. The active VPCT serves to increase fan efficiency and engine thrust while maintaining stall margin at the required safety level. The vaned passage in another embodiment is utilized to abate or preclude the stall precursor waves manifested by the rotor blade by modulating the recirculating flow as a function of time.

18 Claims, 5 Drawing Sheets

ACTIVE VANED PASSAGE CASING TREATMENT

CROSS REFERENCE

The subject matter of this application is related to the subject matter of U.S. patent application Ser. Nos. 07/924,611 and 07/925,312 filed on Aug. 3, 1992 and Jul. 28, 1992, respectively and the Issue Fee for both of these patent applications have been filed in the Patent and Trademark Office and will be issuing as U.S. Pat. Nos. 5,282,718, and 5,308,225, respectively, and both of which were assigned to United Technologies Corporation the assignee of this patent application.

1. Technical Field

This invention relates to gas turbine engines for powering aircraft, marine vehicles and industrial power plants and more particularly to means for enhancing stall margin without adversely impacting engine efficiency by incorporating means for activating and deactivating the vaned passage casing treatment.

2. Background Art

This invention constitutes improvements over the subject matter contained in the patent applications noted in the Cross Reference section of this patent application. The subject matter of the cross referenced patent applications relates to vaned passage casing treatment (VPCT) that judiciously locate a bypass passage in the casing of the rotor of rotating machinery which passage include vanes for straightening the swirling flow being admitted into the passage adjacent the tips of the rotor blades and returning (recirculating) the treated flow to the main stream in a discretely contoured outlet passage. This invention is primarily concerned with the degradation of efficiency of the engine in the event that the case treatment is designed to afford a large stall margin in certain applications. It has been assessed as higher stall margin is built into the design of the case treatment the higher the likelihood that the efficiency of the engine will be adversely affected.

This invention deals with this problem as will become more evident in the description to follow. To appreciate this invention, it will be best to understand the phenomenon of stall and surge that can occur in the axial flow compressors and fans of gas turbine engines. As is well known, surge and stall are phenomena that is characteristic in all types of axial flow fans and compressors and occurs at a given engine operating condition and if left unattended this condition could not only be harmful to the engine's performance but can be deleterious to the engine itself.

Hence, it is axiomatic that throughout the entire evolution of the engine including the initial design through the development and follow-up practice subsequent to the development, those involved pay great heed to the stall and surge characteristics of the rotating machinery to insure that the compromise between the safe operation of the engine and its performance are optimized. Since the point at which stall may occur limits the blades operating pressure ratio for a given corrected air weight flow and since higher pressure ratios enhance engine performance, the engine's operating line is dictated by a compromise between the stall line and performance. It is always desirable to be able to raise the stall line to a higher pressure ratio for a given engine operation. For example, raising the stall line can increase the stall margin between the engine's operating line, or raising the stall line permits raising of the operating line without changing the stall margin, which obviously would result in an increase in engine's performance. Other alternatives can use up the increased stall margin with reduced rotor speed, reduced blade count, reduced rotor chord length, or to eliminate variable geometry to improve component efficiency or lower component weight and complexity.

Experience has shown that because there are so many factors affecting stall, it is not surprising that the stall line may not match its design point. In these situations the engine's hardware is typically modified to satisfy the stall margin requirement so as to meet the engine's specifications. It is also not surprising that this cannot be done without degrading engine performance. This is not to say that there aren't other advantages that are attendant an increase in stall margin.

Also well known by those skilled in this art, rotating stall is a phenomenon that occurs whenever sufficient blades or regions of the blades stall so as to occasion a partial blockage or reversal of flow of air through the rotating blades. Flow separation on the airfoils of the blades can lead to rotating stall which, in turn, can lead to an overall system breakdown of the flow, i.e. surge.

Hence, whenever stall occurs and is allowed to propagate throughout the entire or nearly entire blading, surge can ensue. It, of course, is understood by those skilled in this art, that surge problems can be corrected by either providing means for handling an incipient surge or design the engine so that the engine never operates where a stall can manifest. For example, an incipient stall may be corrected simply by reducing engine power as an alternative to designing the engine so that its operating parameters assure that the engine operates below a given stall line. Also, it is well known in the art that surge may manifest in many different forms and stall may occur in one or more blades and at different regions of each of the blades. The most limiting stall characteristics often occur at the tip of the blades which essentially is the type of stall being addressed by this invention.

As would be expected, it is ideal to be able to increase stall margin and at the same time obtain a corresponding increase in engine performance. More particularly, this invention solves the problem of enhancing the stall line so as to avoid the manifestation of an incipient stall while assuring that the engine does not incur an efficiency deficit at its normal operating condition. It will be understood by those skilled in this art, that the casing treatment described in this invention is not predicated on whether or not the rotating stall could degenerate into a surge condition.

Treatment of the casing in rotating machinery, which is at times referred to as shroud, tip seal or outer air seal, to enhance the stall line is exemplified in the prior art for example, in U.S. Pat. No. 4,239,452 granted to F. Roberts, Jr. on Dec. 1, 1980, commonly assigned to this assignee; U.S. Pat. No. 3,580,692 also commonly assigned to the assignee of this application; U.S. Pat. No. 3,189,260 granted to S. K. Ivanov on Jun. 15, 1965; British Patent No. 504,214 granted to 'Rheinmetall-Borsig Aktiengesellschaft Werk-Borsig Berlin-Tegel' on Apr. 21, 1939; ASME paper reported in the Journal of Fluid Engineering Vol. 109 dated May 1987 and entitled "Improvement of Unstable Characteristics of an Axial Flow Fan by Air-Separator Equipment" authored by Y. Mijake, T. Inola and T. Kato; and a paper from the School of Mechanical Engineering, Cranfield Institute of Technology in Great Britain entitled "Application of Recess Vaned Casing Treatment to Axial Flow Compressor" dated February 1988 and authored by A. R. Aximan, R. L. Elder and A. B. McKenzie. The teachings of these documents are discussed in detail in U.S. patent application Ser. No. 07/925,312, supra and for further detail of these remarks this patent application is incorporated herein by reference.

This invention contemplates deactivating and activating the VPCT to eliminate or reduce the recirculating flow at engine conditions at which higher rotor efficiency and a lower stall margin are required, typically at aircraft climb or cruise conditions, and to allow full recirculating flow where additional stall margin is required, which typically is at aircraft take off conditions. It is contemplated within the scope of this invention that the system could be activated or deactivated by mechanical or pneumatic means. In one preferred embodiment of a pneumatic system an aneroid operated valve that is responsive to a pressure differential related to a vacuum or near vacuum, such as a bellows or inflatable balloon is disclosed. This type of system would be activated or deactivated as a function of altitude.

Another type of system that is contemplated by this invention is where the VPCT is modulated in time as a function of some predetermined parameter or variable such as time variation of fan inlet static pressure, so as to cancel stall precursor waves or as a function of location around the annulus, so as to react to local aircraft's nacelle inlet flow distortions. The modulation of the recirculating flow of the VPCT would result in increased rotor efficiency and engine thrust while maintaining stall margin at the required safety level.

The system of this invention will be fail safe open to insure that a safe stall margin level is always present at the aircraft's takeoff condition. This is the case whether the system is on/off or modulated. It should be understood that this invention disclosed in this patent application is deemed an active VPCT system as opposed to a passive VPCT. The meaning of "active" VPCT in the context of this invention is a system that eliminates or partially eliminates the recirculating flow in the passage or modulates the recirculating flow in the passage. This is in contrast to the systems disclosed in the Patent Applications mentioned in the Cross Reference of this patent application where the recirculating flow in the passage is continuously flowing without altering the geometry of the passage.

SUMMARY OF THE INVENTION

An object of this invention is to provide an improved VPCT.

A feature of this invention is to provide a case treatment that utilizes an active control for either turning the recirculating flow on or off or partially so or modifying as a function of time the recirculating flow.

A still further feature of this invention is to utilize a valve responsive to engine or aircraft operating parameters to activate or deactivate the VPCT system. A typical parameter for an embodiment of this invention is aircraft operating altitudes. Another typical parameter or parameters would be indicative of cruise condition of the aircraft. In a modulated system of this invention the system would be responsive to a function of nacelle inlet flow distortions.

The foregoing and other features of the present invention will become more apparent from the following description and accompanying drawings.

BEST MODE FOR CARRYING OUT THE INVENTION

While this invention is described in its preferred embodiment for use in an engine for powering aircraft operation in order to effectuate activating and deactivating or modulating the VPCT at predetermined engine operating conditions, as will be understood by those skilled in this art this invention has application in other applications. For example, without importing any limitations to the scope of this invention, this invention may have utility in industrial gas turbine engine power plants during start up or in engine re-ignition conditions after the engine components have been operating and changed geometry due to temperature or mechanical growth, which change the clearances with a consequential propensity to stall. Similar problems are also prevalent in marine gas turbine engines.

Figure 1:
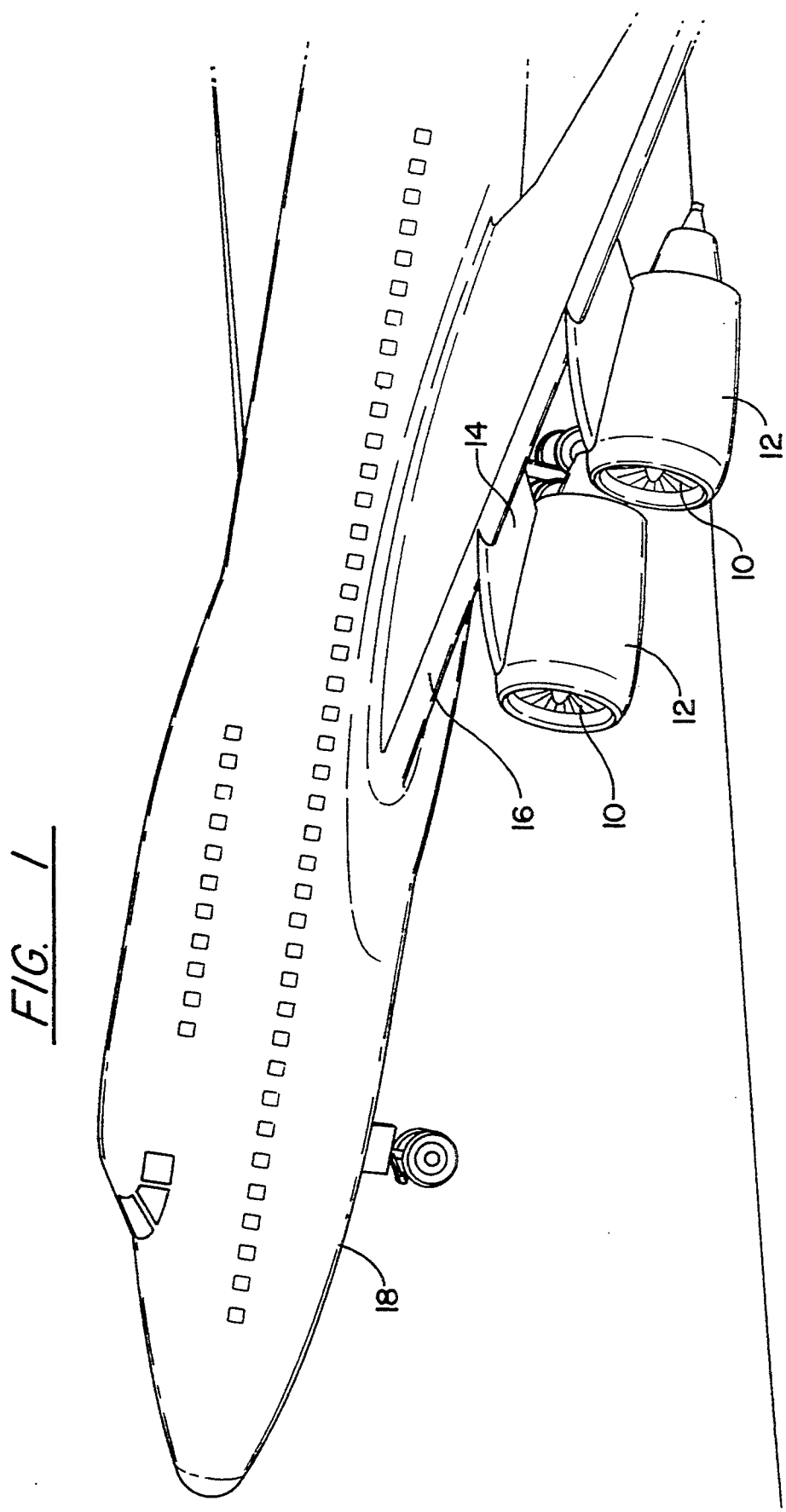
FIG. 1 is a partial view in perspective of an aircraft powered by a gas turbine engine.
Figure 2:
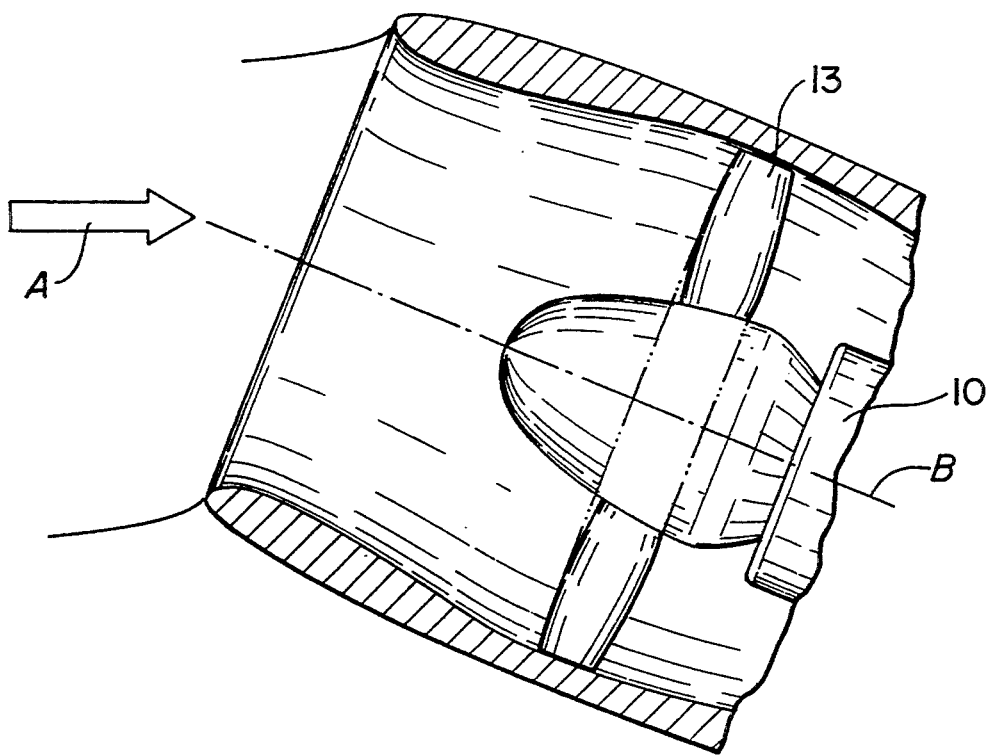
FIG. 2 is a partial view, partly in elevation and partly in section illustrating an advanced ducted fan driven by a gas turbine engine.
Figure 3:
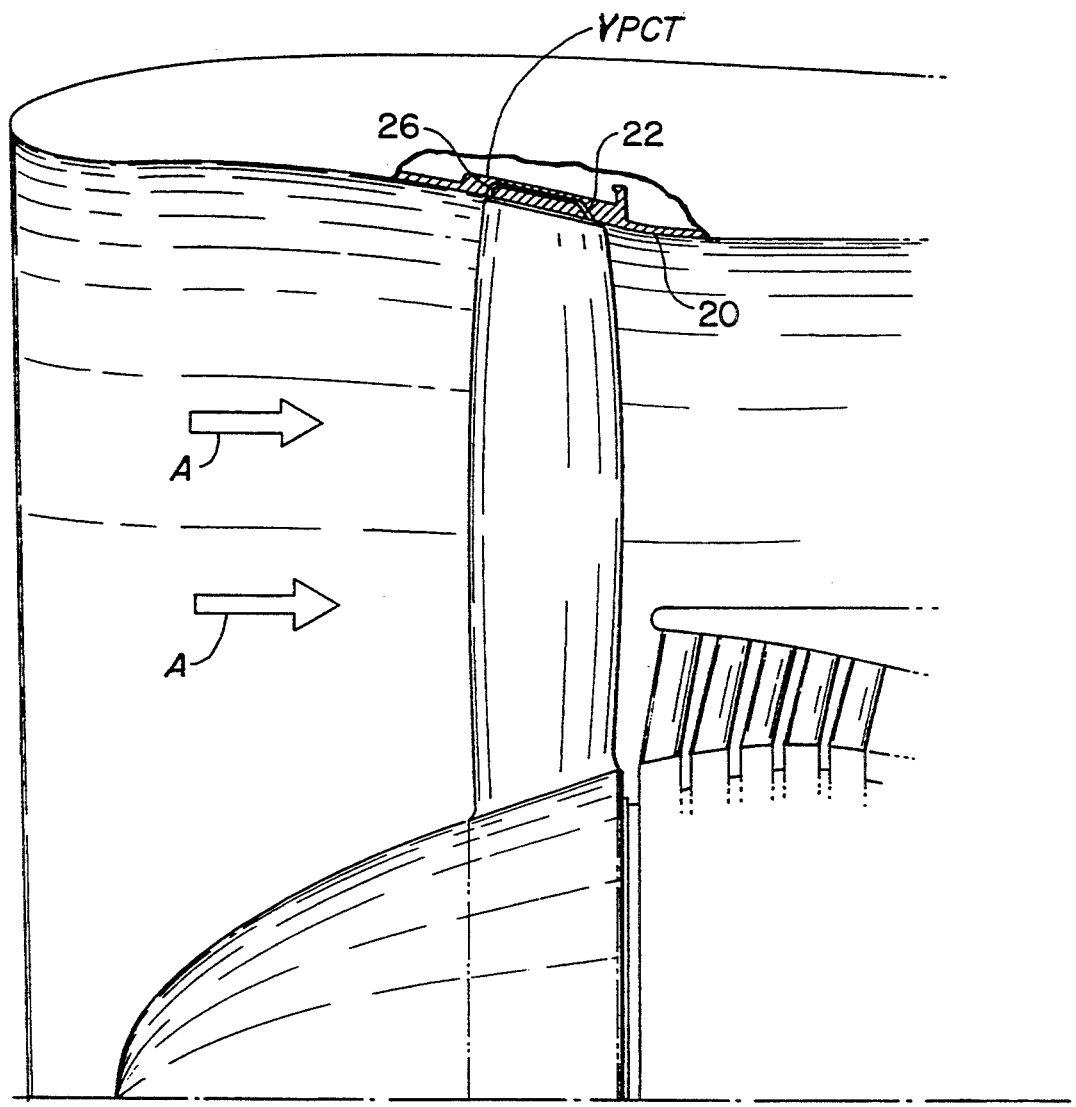
FIG. 3 is a partial view, partly in section and partly in elevation illustrating a prior art fan on a gas turbine engine.

To understand the problem solved by the present invention utilized in gas turbine engines for powering aircraft, reference is made to FIGS. 1-3 which disclose various fans utilized in these types of engines. As shown in FIG. 1, the engine 10 encased in the nacelle 12, and attached by pylon 14 to the underbody of wing 16 serves to generate thrust to propel the aircraft 18. One of the problems associated with these types of propulsive units as described in the background section of this patent application is that the type of engine being utilized on this aircraft is that it is subjected to stall and surge.

The times that the engine is most susceptible to stall is when the aircraft is in the take-off mode and as it assumes a climb attitude. As noted in FIG. 2, which is a turbo fan type of engine that may include variable pitch fan blades 13, the direction of the airstream represented by arrow A is out of line relative to the axis B of the engine. In certain aircraft the nacelle's angle of attack may be 23 degrees or higher. The angle of attack bears a definitive relationship to the propensity of when the fan can enter a stall situation. It is therefore the objective of the engine designer to assure that the aircraft will avoid this stall condition and one of the principal methods of assuring that stall will be avoided is by building into the engine a safe stall margin.

Under certain conditions and in certain engines it has been found that the stall margin has an adverse effect on the performance of the engine. The problem addressed by this invention is to increase the stall margin in certain modes of operation and decrease the stall margin in other modes of operation. As disclosed in the Cross Referenced patent application Ser. Nos. 07/924,611 and 07/925,312, supra, a vaned passage casing treatment has been devised that is utilized to increase the stall margin of the rotor blades.

Figure 4:
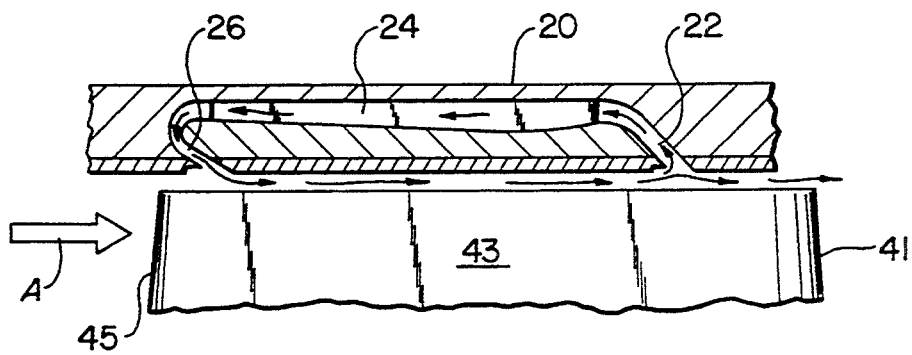
FIG. 4 is a partial view of the prior art vaned passage case treatment.

FIGS. 3 and 4 exemplify prior art configurations of Turbo-Fan engines that utilize prior art VPCT. As noted from these figures the casing 20 of the fan duct includes an outer case passage that bleeds air at the tip of the blades and straightens the flow and returns it to the mainstream (hereinafter referred to as the recirculating flow). The recirculating flow enters the inlet 22 and flows counter to the direction of the mainstream flow and is treated by vanes 24 and returned to the mainstream via the discharge passage 26.

According to this invention, the case passage duct or the VPCT is rendered inoperative or partially so, during certain regimes of the aircraft or engine operation. In the context of this patent application, the VPCT is active as opposed to the VPCT disclosed in the prior art which is deemed passive. The term "active" denotes that the recirculating flow passage is at certain times flowing or partially flowing bleed or recirculating air and at other times it is blocked off or partially blocked off.

Figure 5:
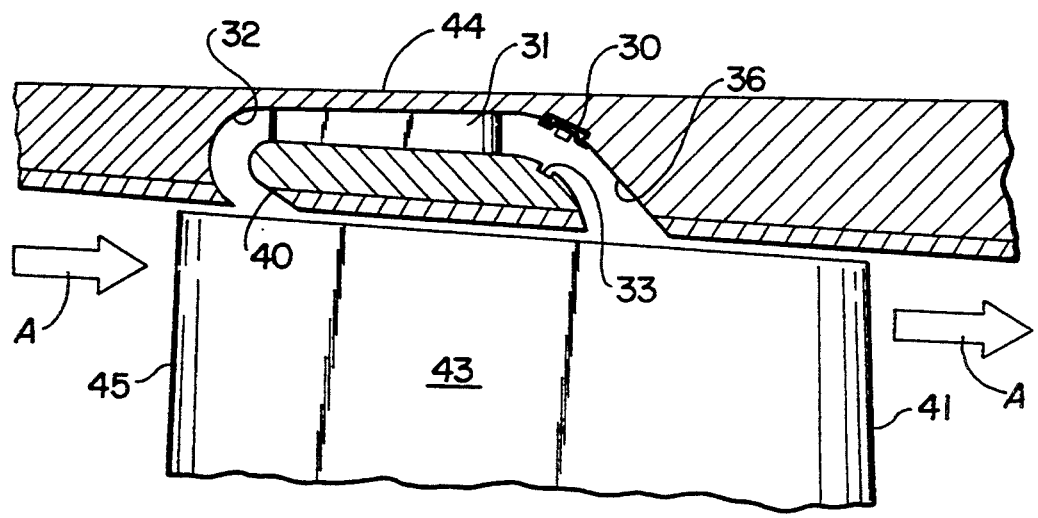
FIG. 5 is a partial view in section illustrating a preferred embodiment of this invention.
Figure 6:
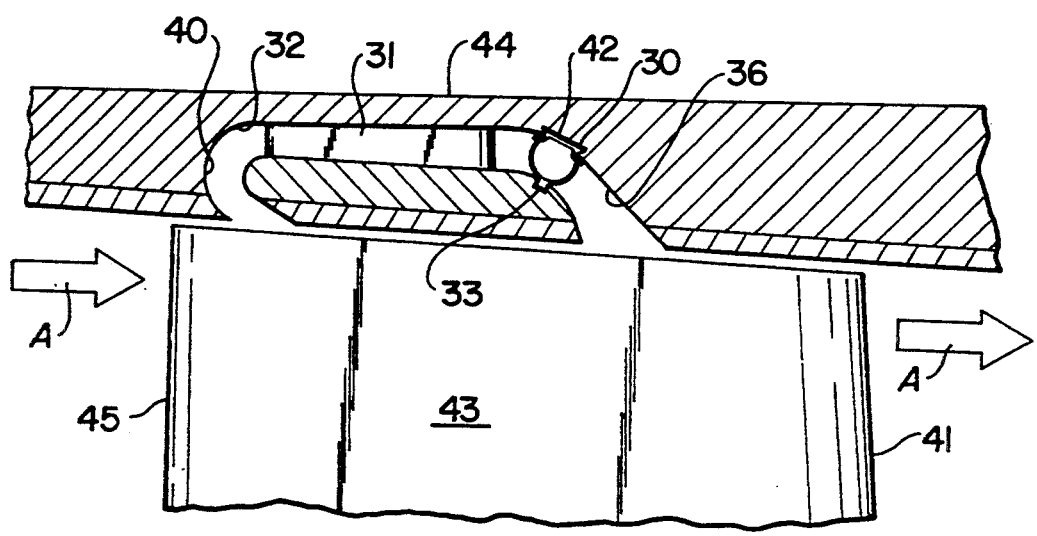
FIG. 6 is a view identical to the apparatus in FIG. 5 illustrating the active vaned passage casing treatment when in the deployed position.

In the embodiment depicted in FIGS. 5 and 6 an aneroid valve 30 is utilized to close off the recirculating flow passage 32 of the VPCT. Valve 30 may be an enclosed capsule such as a balloon fabricated from a suitable elastomeric material that is evacuated to a pressure that permits the ambient pressure to deflate the balloon when the ambient pressure is at predetermined value so that the VPCT is always operative at maximum take off altitude. Obviously, the take off altitude is predicated on the location of the airstrip. As the aircraft climbs in altitude and the ambient pressure decreases the elastomeric material is allowed to expand. Obviously, at a certain pressure differential between the internal and external pressures, the valve 30 will seat against seat 33 and block off the flow. Since the valve 30, per se, is responsive to altitude, the recirculating flow passage will remain open at the take off altitude and begin to close during climb and close at some point in the flight envelope so that it will remain closed during the cruise condition of the aircraft. It is contemplated within the scope of this invention the aneroid valve may take the form of a suitable aneroid bellows. Suitable elastomeric material would be flexible rubbers or synthetic materials, such as any of the polyolefins or other polymeric materials. The aneroid bellows may be fabricated from a flexible, resilient metallic material.

In operation, at sea level and during the take off regime, the VPCT will be fully operative and the flow adjacent the tip of the blades 43 will be removed by flowing into inlet 36, which is located closer to the trailing edge 41 of blade 43, through passage 32 and between the vanes 31 disposed in passage 32 and returned to the main stream via outlet 40, located closer to the leading edge 45 of blade 43. Hence a small amount of flow adjacent the tip of the fan blades is removed from the rear of the fan tip and reintroduced at a high velocity and in a favorable direction in the front portion of the fan.

It will be noted from the foregoing that one end of the valve 30 is attached to support member 42 that is secured to the casing 44. The VPCT that is disposed around the circumference of the casing and surrounds the plurality of fan blades may comprise segmented units, all of which are identical in design and serve identical functions to treat the air around the entire circumference of the casing.

In the preferred embodiment it is apparent that the valve 30 is self actuated and requires no additional control mechanism to actuate the opening and closing of the valve. Additionally, the valve fails open in the event of a malfunction which assures that the stall margin will be at the required safety level during take off when it is most needed. In this mode, the aircraft would operate with the valve open during the cruise condition which would otherwise be closed and in a more favorable condition for engine performance and fuel consumption.

As one skilled in this art will appreciate this invention lends itself to being controlled by other modes. For example, it may take on a control for deploying the valve in cruise or other aircraft operating modes by utilizing controls that respond to engine or aircraft variables. An example of a control that would position the valve when in the cruise position is described in U.S. Pat. No. 4,069,662 granted to Redinger, Jr. et al on Jan. 24, 1978 entitled "Clearance Control for Gas Turbine Engine". In that patent the control senses aircraft altitude and engine speed to activate the valving mechanism. As is true in the system disclosed in the U.S. Pat. No. 4,069,662, supra, these parameters may be taken from the fuel control, if these are its sensed parameters.

Figure 7:
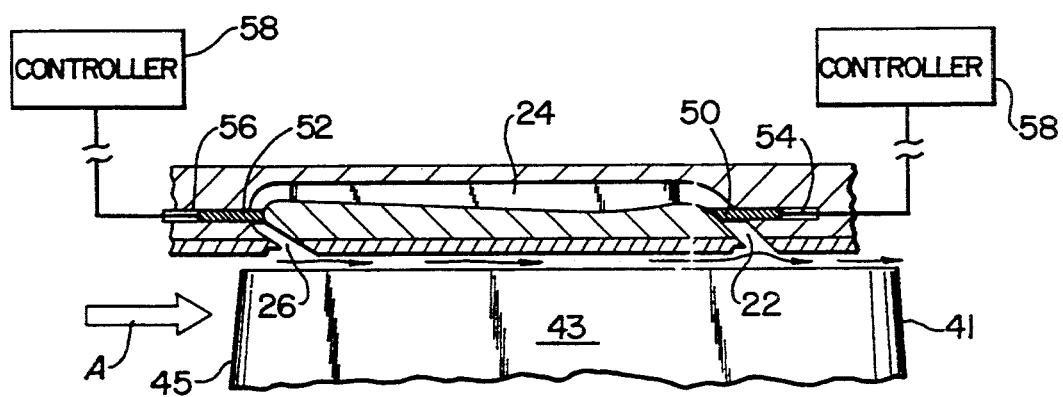
FIG. 7 is a partial view partly in section and partly in schematic exemplifying another embodiment of this invention.

FIG. 7 exemplifies another embodiment that includes sliding valves 50 and 52 disposed in the inlet 22 (like reference numerals depict like parts in the figures) and outlet 26, respectively. Valves 50 and 52 may either be segmented or can be a full circumferential sleeve that fits into the annular grooves 54 and 56, respectively. The control mechanism depicted by the blank boxes 58 represents actuator and controls that may be mechanical, pneumatic, hydraulic or electrically actuated, or a combination thereof. The actuator may be responsive to any number of engine operating variables such as altitude, engine speed, temperature or pressure, aircraft operating modes such as attitude, Mach number and the like, depending on the requirements of the engine and/or aircraft.

For example, the actuator on this active VPCT could respond to a function of time to modulate the valves or valve so as to cancel stall precursor waves, or as a function of location around the annulus so as to react to local nacelle inlet flow distortions. When operating as a function of time the controller would include a clock that would be used as a timer that would be actuated at a predetermined time during the engine operating envelope and would remain in the on position for a predetermined time interval. This would open the valve and modulate it open until the time would elapse to deactivate the valve to the closed position. To react to the flow distortion the controller would sense the pressure from pressure sensor located in strategic locations in the inlet and when the pressure in any of the sensors reaches a predetermined value, the valve would be activated to the open position and be modulated until the pressure subsides. The stall precursor waves that are manifested by the rotor blades can be precluded or abated by modulating in time the recirculating flow in the VPCT. It is apparent from the foregoing the apparatus or system of this invention the blockage of or the modulation of the recirculating flow of the VCPT would result in increased fan efficiency and engine thrust while maintaining stall margin at the required safety level.

Although this invention has been shown and described with respect to detailed embodiments thereof, it will be appreciated and understood by those skilled in the art that various changes in form and detail thereof may be made without departing from the spirit and scope of the claimed invention.

I claim:

1. An active vaned passage casing treatment for a rotor supported for rotary motion, a plurality of circumferentially spaced blades supported in said rotor for rotation for flowing air therethrough, each of said blades having a tip a casing surrounding said blades, a passage in said casing adjacent said tip having an inlet and an outlet and flow straightening means disposed therebetween to remove air through said inlet adjacent said tip of each of said blades and return said air through said outlet adjacent said tip, means for rendering said passage inoperative to prevent the flow of air therein at predetermined operations of said rotor when it is rotating.

2. An active vaned passage casing treatment for a rotor as claimed in claim 1 wherein said means includes a valve.

3. An active vaned passage casing treatment for a rotor as claimed in claim 2 wherein said valve is self actuating.

4. An active vaned passage casing treatment for a rotor as claimed in claim 3 wherein said valve includes an enclosed capsule and is evacuated to a predetermined pressure whose value is below ambient at a predetermined ambient condition.

5. An active vaned passage casing treatment for a rotor as claimed in claim 4 wherein said capsule is formed from an elastomeric material.

6. An active vaned passage casing treatment for a rotor as claimed in claim 5 wherein each of said blades include a trailing edge and a leading edge, said inlet is at a location adjacent said trailing edge and said outlet is adjacent said leading edge.

7. An active vaned passage casing treatment for a rotor as claimed in claim 1 including valve means disposed in said inlet and said outlet.

8. An active vaned passage casing treatment in combination with a gas turbine engine including a rotor supported for rotary motion, a plurality of circumferentially spaced blades each having a tip supported in said rotor for rotation for flowing air therethrough, a casing surrounding said blades adjacent said tip, a passage in said casing adjacent said tip having an inlet and an outlet and flow straightening means disposed therebetween to remove air through said inlet adjacent said tip of each of said blades and return said air through said outlet adjacent said tip, means for rendering said passage inoperative to prevent the flow of air therein at predetermined operations of said rotor when it is rotating.

9. An active vaned passage casing treatment in combination with a gas turbine engine as claimed in claim 8 wherein said rotor includes an axial flow fan and a bypass duct surrounding said fan, said fan including a leading edge and a trailing edge, said inlet being disposed adjacent said trailing edge, said outlet being disposed adjacent said leading edge, said passage disposed in said bypass duct, means including valve means responsive to an engine operating condition disposed in said passage for blocking off the flow in said passage during predetermined conditions of said fan operations.

10. An active vaned passage casing treatment in combination with a gas turbine engine as claimed in claim 9 wherein said gas turbine engine powers aircraft, means responsive to the altitude of said aircraft for controlling said valve.

11. An active vaned passage casing treatment in combination with a gas turbine engine as claimed in claim 10 wherein said means responsive to said altitude is an aneroid enclosed capsule.

12. An active vaned passage casing treatment in combination with a gas turbine engine as claimed in claim 10 wherein said fan is disposed in the nacelle of said aircraft and said nacelle includes an inlet to said engine, means responsive to a function of flow distortions in said inlet.

13. An active vaned passage casing treatment in combination with a gas turbine engine as claimed in claim 11 wherein said capsule is formed from an elastomeric material.

14. An active vaned passage casing treatment in combination with a gas turbine engine as claimed in claim 13 wherein said enclosed capsule is evacuated to a predetermined pressure whereas said capsule blocks off flow in said passage at a predetermined pressure differential between the internal and external pressure acting over the elastomeric material.

15. An active vaned passage casing treatment in combination with a gas turbine engine as claimed in claim 10 wherein said means for rendering said passage inoperative blocks off the flow in said passage during cruise operation of said aircraft and opens said passage during take off operation of said aircraft.

16. An active vaned passage casing treatment in combination with a gas turbine engine as claimed in claim 15 wherein said means for rendering said passage inoperative is fail safe to open said passage upon malfunction of said means for rendering said passage inoperative.

17. An active vaned passage casing treatment for a rotor as claimed in claim 2 wherein said means includes said valve disposed in said inlet and another valve is disposed in said outlet.

18. An active vaned passage casing treatment for a rotor supported for rotary motion, a plurality of circumferentially spaced blades supported in said rotor for rotation for flowing air therethrough and being subjected to stall precursor static pressure waves, a casing surrounding said blades, each of said blades having a tip, a passage in said casing adjacent said tip having an inlet and an outlet and flow straightening means disposed therebetween to remove air through said inlet adjacent said tip of each of said blades and return said air through said outlet adjacent said tip, means for canceling the stall precursor static pressure waves by controlling the flow of air in said passage and control means responsive to a function of time to control said means for canceling the stall precursor static pressure waves to modulate the flow in said passage.

* * * * *